United States Patent
Bauer et al.

(10) Patent No.: US 7,132,390 B2
(45) Date of Patent: Nov. 7, 2006

(54) PHYLLOSILICATE ADSORBATE AND ITS USE

(75) Inventors: Harald Bauer, Kerpen (DE); Günther Schimmel, Erftstadt (DE)

(73) Assignee: Clariant GmbH, Frankfurt (DE)

( * ) Notice: Subject to any disclaimer, the term of this patent is extended or adjusted under 35 U.S.C. 154(b) by 66 days.

(21) Appl. No.: 10/896,126

(22) Filed: Jul. 21, 2004

(65) Prior Publication Data

US 2005/0043197 A1 Feb. 24, 2005

(30) Foreign Application Priority Data

Jul. 25, 2003 (DE) ................ 103 34 047

(51) Int. Cl.
C11D 7/10 (2006.01)
C11D 7/14 (2006.01)

(52) U.S. Cl. ............ 510/232; 510/220; 510/223; 510/229; 510/230; 510/255; 510/514; 510/533; 510/398; 510/401; 510/438; 510/444; 510/488; 510/508

(58) Field of Classification Search ........... 510/220, 510/223, 229, 230, 232, 255, 514, 533, 398, 510/401, 438, 444, 488, 508
See application file for complete search history.

(56) References Cited

U.S. PATENT DOCUMENTS

| | | | |
|---|---|---|---|
| 2,575,576 A | 11/1951 | Bacon et al. | |
| 3,923,742 A | 12/1975 | Haschke et al. | |
| 4,664,839 A | 5/1987 | Rieck | |
| 4,839,461 A | 6/1989 | Boehmke | |
| 4,917,812 A | 4/1990 | Cilley | |
| 5,175,361 A | 12/1992 | Denzinger et al. | |
| 5,221,733 A | 6/1993 | Koskan et al. | |
| 5,227,446 A | 7/1993 | Denzinger et al. | |
| 5,457,176 A | 10/1995 | Adler et al. | |
| 5,574,120 A | 11/1996 | Heidel et al. | |
| 5,580,941 A | 12/1996 | Kraus et al. | |
| 5,610,255 A | 3/1997 | Groth et al. | |
| 5,639,832 A | 6/1997 | Kroner et al. | |
| 5,747,635 A | 5/1998 | Kroner et al. | |
| 5,760,154 A | 6/1998 | Kraus et al. | |
| 5,830,956 A | 11/1998 | Klimmer et al. | |
| 6,207,780 B1 | 3/2001 | Stockhausen et al. | |
| 6,462,006 B1 * | 10/2002 | Sorg et al. | 510/220 |
| 6,622,736 B1 | 9/2003 | Hahn | |
| 2004/0176268 A1 | 9/2004 | Schimmel et al. | |
| 2005/0075258 A1 * | 4/2005 | Kessler et al. | 510/221 |

FOREIGN PATENT DOCUMENTS

| | | |
|---|---|---|
| CA | 2053900 | 10/1990 |
| CA | 2038332 | 9/1991 |
| CA | 2196336 | 2/1996 |
| WO | WO 9530731 | 11/1995 |
| WO | 03/01644 | * 2/2003 |
| WO | WO 03016444 | 2/2003 |
| WO | WO 03104370 | 12/2003 |

OTHER PUBLICATIONS

Abstract of WO 9530731, Nov. 16, 1995.
Abstract of WO 03/104370, Dec. 18, 2003.
Abstract of WO 03/01644, Feb. 27, 2003.

* cited by examiner

*Primary Examiner*—Charles Boyer
(74) *Attorney, Agent, or Firm*—Richard P. Silvermar

(57) ABSTRACT

The invention provides an adsorbate which comprises a soluble zinc compound of a polycarboxylic acid adsorbed on crystalline alkali metal phyllosilicate, and the use thereof.

38 Claims, No Drawings

PHYLLOSILICATE ADSORBATE AND ITS USE

The present invention relates to a phyllosilicate adsorbate and to its use.

According to EP-A-0 383 482 and PCT/WO 00/39259 the corrosion of glassware in the course of rinsing and/or washing operations in a machine dishwasher is a problem which has been known for a long time. On the one hand, the corrosion of glassware is apparently based on the emergence of minerals from the glass composition, accompanied by hydrolysis of the silicate network. On the other hand, there is deposition of silicate material on the glassware. On repeated washing of the glassware in a dishwasher, both phenomena may lead to damage to the glassware, such as clouding, scratches, shimmer (iridescence), streaks or the like.

According to EP-A-0 383 482 zinc protects glass articles against corrosion and results in glassware which imparts a clear appearance for a longer period of time than glassware which has not been treated with zinc.

U.S. Pat. No. 2,575,576 describes the formation of unwanted precipitates by the mixtures of alkali metal salts such as sodium carbonates, phosphates, silicates, or sulfates with water-soluble zinc compounds or aluminum compounds. The introduction of soluble metal salts (aluminates of alkali metals, or zincates or berylliates) into machine dishwash formulations can result in precipitation of insoluble material, which is highly undesirable and may deposit on dishwasher components and on ware in the course of the wash cycle.

EP-A-0 383 482 proposes sparingly soluble zinc salts such as zinc silicate, zinc carbonate, zinc oxide, basic zinc carbonate ($Zn_2(OH)_2CO_3$), zinc hydroxide, zinc oxalate, zinc monophosphate ($Zn_3(PO_4)_2$) and zinc pyrophosphate ($Zn_2P_2O_7$). A disadvantage of this prior art is that adequate and optimum metering is difficult to ensure, owing to the low solubility of the zinc salts. Moreover, owing to the high density of the insoluble zinc compounds listed, there may be separation problems in the case of powder mixtures or settling in the case of liquid mixtures.

The object was therefore to provide a highly soluble corrosion preventative, particularly for machine dishwashing detergents, which is comparatively easy to meter and where there is no danger of formation of insoluble zinc precipitates on the surface of the ware.

This object is achieved by means of an adsorbate which comprises a soluble zinc compound of a polycarboxylic acid adsorbed on crystalline alkali metal phyllosilicate.

Surprisingly it has been found that the use of the soluble zinc compound of a polycarboxylic acid adsorbed on a crystalline phyllosilicate allows effective prevention of ware deposits. This is a substantial advance over other soluble zinc compounds according to the prior art.

Surprisingly it has been found that the inventive soluble zinc compound of a polycarboxylic acid, when adsorbed on an alkali metal phyllosilicate, remains free-flowing as an adsorbate if stored under moist conditions. The application to crystalline phyllosilicate and agglomeration to a granular product and the fact that the product remains free-flowing even on exposure to atmospheric moisture allows particularly economic production of detergents, especially machine dishwashing detergents.

The adsorbate preferably contains from 50 to 99% by weight of crystalline alkali metal phyllosilicate, from 0.1 to 40% by weight of polycarboxylic acid and from 0.1 to 20% by weight of zinc (calculated as the element).

The adsorbate more preferably contains from 60 to 95% by weight of crystalline alkali metal phyllosilicate, from 10 to 30% by weight of polycarboxylic acid and from 0.1 to 10% by weight of zinc (calculated as the element).

The polycarboxylic acid is composed preferably of from 10 to 70% by weight of maleic acid, from 20 to 85% by weight of acrylic acid, from 0 to 10% by weight of vinyl acetate and from 0 to 10% by weight of further monomers, with a degree of neutralization of from 0 to 70.

The polycarboxylic acid preferably comprises homopolymers and/or copolymers of acrylic acid, methacrylic acid, maleic acid, polyaspartic acid, sugar carboxylic acid and/or further monomers, the polymers being non-neutralized or only partly neutralized.

The polycarboxylic acid normally has an average molar mass of from 1000 to 100 000 g/mol, preferably from 2000 to 70 000 g/mol and more preferably from 2000 to 35 000 g/mol.

The polycarboxylic acid employed preferably has a degree of neutralization of the acid groups of from 1 to 100%, preferably from 10 to 90% and more preferably from 30 to 70%.

The adsorbate preferably has a pH of from 8 to 10, more preferably from 10 to 12, at 2° C. after 10 min in 0.1% aqueous dispersion.

The adsorbate preferably has a bulk density of between 400 and 800 g/l, more preferably between 400 and 700 g/l.

The adsorbate preferably has a Hunter whiteness (Hunter L value) of from 80 to 100, more preferably from 85 to 95.

The adsorbate preferably has a Hunter a value of from −1.5 to +1.5, more preferably from −0.8 to 0.

The adsorbate preferably has a Hunter b value of from 0 to +2, more preferably from 0.2 to 1.5.

A negative Hunter a value indicates a green tint, a positive Hunter a value a red tint. A negative Hunter b value indicates a blue tint, a positive value a yellow tint.

The adsorbate preferably has a release rate of from 0.0001 to 12 g zinc*$l^{-1}$*$lh^{-1}$, more preferably from 0.0002 to 2.4 g zinc *$^{-1}$*$h^{-1}$.

The invention also relates to a process for preparing an adsorbate which comprises agglomerating a solution of the soluble zinc compound of a polycarboxylic acid with crystalline alkali metal phyllosilicate in a granule-building mixer and then drying the agglomerate.

Agglomeration is preferably conducted at from 0 to 200° C. under a pressure of from 0.1 to 100 bar for a time of from 0.01 h to 1 h.

Another process for preparing an adsorbate comprises adsorbing the soluble zinc compound of a polycarboxylic acid onto crystalline alkali metal phyllosilicate by roll compacting, grinding and classifying.

A further process for preparing an adsorbate comprises adsorbing the soluble zinc compound of a polycarboxylic acid onto crystalline alkali metal phyllosilicate by fluid-bed size-enlargement granulation.

The invention also relates to a process for releasing a soluble zinc compound into detergent solutions, which comprises agglomerating a soluble zinc compound of a polycarboxylic acid with an alkali metal phyllosilicate, mixing the agglomerate with the usual detergent ingredients and dissolving the mixture in defined amounts in mains water or deionized water.

The invention likewise relates to the use of soluble zinc compound of a polycarboxylic acid adsorbed on alkali metal phyllosilicate in detergents.

Finally the invention also relates to laundry and other detergents (machine dishwashing detergents) containing from 10 to 90% by weight of builders and cobuilders from 1 to 90% by weight of pH regulators from 0.1 to 20% by weight of bleach from 0 to 10% by weight of surface-active substances from 0.01 to 10% by-weight of adsorbate of the invention.

The laundry and other detergents (machine dishwashing detergents) preferably contain from 20 to 50% by weight of builders and cobuilders from 10 to 50% by weight of pH regulators from 1 to 20% by weight of bleach from 0 to 10% by weight of surface-active substances from 0.1 to 10% by weight of adsorbate of the invention.

Alternatively the laundry and other detergents (heavy-duty laundry detergents) contain from 10 to 90% by weight of builders and cobuilders from 1 to 9% by weight of pH regulators from 0.1 to 50% by weight of surface-active substances from 1 to 10% by weight of bleach from 0.1 to 10% by weight of adsorbate of the invention.

Different laundry and other detergents (color detergents for laundry) contain from 10 to 90% by weight of builders and cobuilders from 1 to 9% by weight of pH regulators from 0.1 to 50% by weight of surface-active substances from 0.1 to 10% by weight of adsorbate of the invention.

Preference is given to an average particle diameter d50 of from 200 to 2000 μm, more preferably from 300 to 800 μm, for the adsorbate.

The crystalline alkali metal phyllosilicate preferably comprises crystalline layered alkali metal disilicate of the formula x $M_2O*y$ $SiO_2*z$ $H_2O$ having a molar ratio of $SiO_2$ to $M_2O$ of (from 1 to 3.5): 1 where z=0 to 4 and M=Na and/or K, it being possible for said disilicate to contain up to 10% by weight of further elements and/or compounds.

The further elements and/or compounds are preferably magnesium, calcium, zinc, aluminum, lanthanum, tin, titanium, zirconium, manganese, iron and/or compounds thereof.

More preferably the alkaline silicate is a crystalline layered sodium disilicate.

Crystalline layered sodium disilicate is composed of varying percentage fractions of the polymorphic phases alpha, beta, delta and epsilon. Commercial products may also contain X-ray-amorphous fractions.

Preferred crystalline layered sodium disilicates have a phase composition of from 0 to 40% by weight of alpha-sodium disilicate, from 0 to 40% by weight of beta-sodium disilicate, from 40 to 100% by weight of delta-sodium disilicate and from 0 to 40% by weight of amorphous fractions.

Particularly preferred crystalline layered sodium disilicates have a phase composition of from 7 to 21% by weight of alpha-sodium disilicate, from 0 to 12% by weight of beta-sodium disilicate and from 65 to 95% by weight of delta-sodium disilicate. Particular preference is given to crystalline layered sodium disilicates having a delta-$Na_2Si_2O_5$ fraction of from 80 to 100% by weight.

In another embodiment it is also possible to use crystalline layered sodium disilicates having a beta-$Na_2Si_2O_5$ fraction of from 80 to 100% by weight.

The aforementioned alpha-sodium disilicate corresponds to the Na-SKS-5 described in EP-B-0 164 514, characterized by the X-ray diffraction data reproduced therein which are assigned to the alpha-$Na_2Si_2O_5$ whose X-ray diffraction diagrams are registered with the Joint Committee on Powder Diffraction Standards with the numbers 18-1241, 22-1397, 22-1397A, 19-1233, 19-1234 and 19-1237.

The aforementioned beta-sodium disilicate corresponds to the Na-SKS-7 described in EP-B-0 164 514, characterized by the X-ray diffraction data reproduced therein which are assigned to the beta-$Na_2Si_2O_5$ whose X-ray diffraction diagrams are registered with the Joint Committee on Powder Diffraction Standards with the numbers 24-1123 and 29-1261.

The aforementioned delta-sodium disilicate corresponds to the Na-SKS-6 described in EP-B-0 164 514, characterized by the X-ray diffraction data reproduced therein which are assigned to the delta-$Na_2Si_2O_5$ whose X-ray diffraction diagrams are registered with the Joint Committee on Powder Diffraction Standards with the number 22-1396.

Polycarboxylic Acid

The acidic polycarboxylate used is preferably a homopolymer and/or copolymer of acrylic acid, methacrylic acid, maleic acid, polyaspartic acid, sugar carboxylic acid and/or further monomers, said polymer being non-neutralized or only partly neutralized.

Included herein are the homopolymers of acrylic acid or of methacrylic acid and/or copolymers thereof with further ethylenically unsaturated monomers such as acrolein, dimethylacrylic acid, ethylacrylic acid, vinylacetic acid, allylacetic acid, maleic acid, fumaric acid, itaconic acid, meth (allylsulfonic acid), vinylsulfonic acid, styrenesulfonic acid, acrylamidomethylpropanesulfonic acid, and also monomers containing phosphoric acid groups, such as vinylphosphonic acid, allylphosphonic acid and acrylamidomethylpropanephosphonic acid and salts thereof and also hydroxyethyl (meth)acrylate sulfates, allyl alcohol sulfates and allyl alcohol phosphates.

The aforementioned polymers are described for example in DE-A-23 57 036, DE-A-44 39 978, EP-A-0 075 820 and EP-A-0 451 508.

Of particular suitability for application in accordance with the invention are biodegradable terpolymers obtainable by polymerizing a) from 10 to 70% by weight of monoethylenically unsaturated dicarboxylic acids having 4 to 8 carbon atoms and/or salts thereof b) from 20 to 85% by weight of monoethylenically unsaturated monocarboxylic acids having 3 to 10 carbon atoms and/or salts thereof c) from 1 to 50% by weight of unsaturated monomers which following hydrolysis release hydroxyl groups on the polymer chain d) from 0 to 10% by weight of further, free-radically copolymerizable monomers, the sum of the monomers according to a) to d) being 100% by weight, in aqueous solution and hydrolyzing the monomers according to c). For application in accordance with the invention preference is given to hydrolysis in an acidic medium. Products of the aforementioned type are described in DE-A-43 00 772 and in DE-A-195 16 957.

Likewise suitable for application in accordance with the invention are graft polymers of monosaccharides, oligosaccharides, polysaccharides and modified polysaccharides, as described in DE-A-40 03 172 and DE-A-44 15 623. The graft polymers described in EP-A-0 457 025 with proteins of animal and plant origin, including in particular those with modified proteins, are likewise highly suitable for application in accordance with the invention.

From the group of the graft copolymers it is preferred to use copolymers of sugar or other polyhydroxy compounds and a monomer mixture of the following composition:

a) from 45 to 96% by weight of monoethylenically unsaturated $C_3$ to $C_{10}$ monocarboxylic acid or mixtures of $C_3$ to $C_{10}$ monocarboxylic acids and/or salts thereof with monovalent cations b) from 4 to 55% by weight of monoethylenically unsaturated monomers containing monosulfonic acid groups, monoethylenically unsaturated sulfuric esters, vinyl phosphonic acid and/or the salts of these acids with monovalent cations c) from 0 to 30% by weight of water-soluble, monoethylenically unsaturated compounds modified with from 2 to 50 mol of alkylene oxide per mole of monoethylenically unsaturated compound.

Such compounds are described in DE-A-42 21 381 and in DE-A-43 43 993.

Further suitable polymers are polyaspartic acids and/or derivatives thereof in non-neutralized or only partly neutralized form. The polyaspartic acids are normally obtained in the form of their alkali metal or ammonium salts. The non-neutralized or only partly neutralized products can be obtained from these salts by adding corresponding amounts of organic or inorganic acids and separating off the resultant salts where appropriate.

Such products can also be obtained by the thermal reaction of maleic acid and ammonia or by the condensation of aspartic acid and subsequent hydrolysis of the resultant polysuccinimde. The preparation of such products is described for example in DE-A-36 26 672, DE-A-43 07 114, DE-A-44 27 287, EP-A-0 612 784, EP-A-0 644 257 and PCT/WO 92/14753.

Particularly suitable for preparing the inventive soluble zinc compound of a polycarboxylic acid are graft polymers of acrylic acid, methacrylic acid, maleic acid and further ethylenically unsaturated monomers onto salts of polyaspartic acid such as are normally obtained in the above-described hydrolysis of polysuccinimide. In this case it is possible to forgo the otherwise necessary addition of acid for preparing the only partly neutralized form of polyaspartic acid. The amount of polyaspartate is normally chosen such that the degree of neutralization of all of the carboxyl groups incorporated in the polymer does not exceed 80%, preferably 60%. Products of the aforementioned type are described in more detail in PCT/WO 94/01486.

Preferred ranges for the above-described polymers are as follows:

Average molar mass: from 1000 to 100 000 g/mol, preferably from 2000 to 70 000 g/mol and more preferably from 2000 to 35 000 g/mol.

Degree of neutralization of the acid groups: from 0 to 90%, preferably from 30 to 70%.

Water content of the polymer solutions: from 30 to 70% by weight, preferably from 40 to 60% by weight.

Viscosity of the polymer solutions: less than 2000 Pa*s at 20° C.

The pH of the polymer solution should be less than 5.5.

Preference is given to highly water-soluble zinc salts such as zinc halides (chlorides, bromides), zinc salts of the oxo acids of main groups five, six and seven (nitrates, sulfates, halogenites, hypohalogenites, halogenates, perhalogenates), zinc salts of mono-, di-, oligo- and polycarboxylic acids (formate, acetate, propionate, butyrate, benzoate, salicylate, lactic acid, acrylic acid, maleic acid, succinic acid, etc.), of acidic hydroxy functions (phenolate etc.) or zinc salts which dissolve homogeneously in acidic polymer, such as zinc oxide (activated), zinc oxide hydroxide, zinc hydroxide, basic zinc carbonate, zinc hydroxide carbonate, and zinc carbonate. Preference extends to elemental zinc, preferably in the form of bars, beads, grains, powder or dust.

The soluble zinc compound of a polycarboxylic acid is used preferably in the form of a solution. For this purpose a zinc compound is mixed with the acidic form of the polymeric carboxylic acid (acid polymer).

Soluble Zinc Compound of a Polycarboxylic Acid.

Preferably from 1 to 100%, more preferably from 10 to 90% and very preferably from 30 to 70% of the bindable carboxyl functions of the polycarboxyl polymer are satisfied by zinc ions. Accordingly the polycarboxylic acid used has a degree of neutralization of the acid groups of from 1 to 100%, preferably from 10 to 90% and more preferably from 30 to 70%.

In the adsorbate, in contrast, the degree of neutralization is toward 100%.

The soluble zinc compound of a polycarboxylic acid contains in accordance with the invention from 1 to 40% by weight of Zn and from 1 to 50% by weight of carboxylic acids (calculated as $CO_2$), more preferably from 5 to 30% by weight of Zn and from 5 to 40% by weight of carboxylic acids (calculated as $CO_2$).

The solution of the soluble zinc compound of a polycarboxylic acid contains in accordance with the invention from 1 to 99% by weight of soluble zinc compound of a polycarboxylic acid and more preferably from 10 to 50% by weight of soluble zinc compound of a polycarboxylic acid and from 50 to 90% by weight of water.

The zinc salt and the polymer can be mixed at from 0 to 200° C. under a pressure of from 0.1 to 100 bar for a time of from 0.01 h to 1 h.

The soluble zinc compound of a polycarboxylic acid is preferably used in the solid pulverulent state.

Drying can be carried out in a drying cabinet, belt dryer, etc. Preferably drying takes place by spray drying (e.g. in a spray dryer from Niro).

Drying can be carried out at from 0 to 300° C. under a pressure of from 0.0001 to 100 bar for a time of from 0.01 h to 10 h.

After drying, the product can be ground. Mills which can be used in accordance with the invention are vibrating mills, ball mills, roll mills and pendulum roller mills (e.g., from Neumann & Esser), hammer mills, impact mills or air jet mills (e.g., from Hosokawa-Alpine).

The milled material is classified into oversize, target product and undersize, preferably by screening and/or sieving. Particular preference is given to sieving. Suitable sieves are those, for example, from Rhewum, Locker or Allgeier.

The soluble compound of polycarboxylic acid and zinc adsorbed on crystalline phyllosilicate is preferably used in the form of an agglomerate.

A preferred process for preparing these agglomerates comprises agglomerating a solution of the inventive soluble zinc compound of a polycarboxylic acid with crystalline alkali metal phyllosilicate in a grain-building mixer. This is preferably followed by drying.

The mixing of the zinc salt and the polymer with the crystalline alkali metal phyllosilicate can be carried out at from 0 to 200° C. under a pressure of from 0.1 to 100 bar for a time of from 0.01 h to 1 h.

Suitable grain-building mixers may include any of the following: e.g., Lödige plowshare mixers, Lödige CB annular gap mixers, Papenmeier mixers, Henschel mixers, Eirich mixers and Schugi mixers.

Drying is carried out using a stream of heated gas, for example, simultaneously with mixing. Additionally a downstream fluid-bed dryer, etc., can be used. The heated gas is preferably steam, air or nitrogen.

Drying can be carried out at from 0 to 300° C. under a pressure of from 0.1 to 100 bar for a time of from 0.01 h to 1 h.

The particle size of the inventive alkali metal phyllosilicate for agglomeration is preferably from 1 to 2000 µm, more preferably from 10 to 200 µm.

Another embodiment for preparing the soluble zinc compound of a polycarboxylic acid adsorbed on alkali metal phyllosilicate provides for grain building by roll compacting, grinding and classifying.

Preference is given to preparing compression granules (to an average particle size of $d_{50}=100$ to 800 µm). Compression granulation can be carried out using the processes of roll compacting, briquetting etc. In the case of roll compacting a compression pressure of from 10 kN/cm to 100 kN/cm is preferred and a compression pressure of from 30 kN/cm to 80 kN/cm is particularly preferred. Optionally it is possible to add up to 10% by weight of granulating aids (water, waterglass, polyethylene glycol, nonionic surfactants, anionic surfactants, polycarboxylate copolymer, etc.).

A further embodiment for preparing the soluble zinc compound of a polycarboxylic acid adsorbed on alkali metal phyllosilicate provides for grain building by fluid-bed size-enlargement granulation (e.g., in a fluid-bed granulator from Inprotec). For that purpose the alkali metal phyllosilicate is preferably introduced as the fluid-bed component and the soluble zinc compound of a polycarboxylic acid is applied by spraying.

Granulation can be carried out at from 0 to 300° C. under a pressure of from 0.1 to 100 bar for a time of from 0.01 h to 1 h.

A further embodiment for a process for preparing the soluble zinc compound of a polycarboxylic acid adsorbed on alkali metal phyllosilicate provides for the application of soluble Zn salt in aqueous polymer-free solution to an agglomerate of alkali metal phyllosilicate and polycarboxylic acid. The polycarboxylic acid is preferably mixed with alkali metal phyllosilicate in a Schugi mixer and the mixture is agglomerated in a downstream fluid bed and dried. In a further step a solution of soluble zinc compound is mixed in and preferably drying is repeated.

Use in Detergents

In accordance with the invention the soluble zinc compound of a polycarboxylic acid adsorbed on alkali metal phyllosilicate is used in liquid, solid, gel and shaped laundry and other detergents. Laundry detergents and other detergents in accordance with the invention are machine dishwash products, hand dishwash products, heavy-duty laundry detergents, compact laundry detergents, ultracompact laundry detergents and specialty laundry detergents (color laundry detergents, scouring salts, water softeners).

Process for Releasing a Soluble Zinc Compound

A process of the invention for releasing a soluble zinc compound into detergent solutions comprises agglomerating a soluble zinc compound of a polycarboxylic acid with an alkali metal phyllosilicate, mixing the agglomerate with the usual detergent ingredients and dissolving the mixture in defined amounts in mains water or deionized water.

In the case of machine dishwashers, the deionized water is obtained from mains water by means of the built-up ion exchanger.

The use concentration of soluble zinc compound of a polycarboxylic acid is preferably from 0.0001 g/l to 0.2 g/l zinc, more preferably from 0.008 to 0.03 g/l zinc. The preferred dissolution rate (release rate) is from 0.0001 to 12 g zinc$*l^{-1}*h^{-1}$, more preferably from 0.0002 to 2.4 g zinc $*l^{-1}*h^{-1}$.

Builders and Cobuilders

The builders for dishwash products are preferably monomeric, oligomeric or polymeric or copolymeric carboxylic acids, alkali metal orthophosphates, pyrophosphates and polyphosphates (monomeric, dimeric, oligomeric or polymeric alkali metal phosphates, preferably pentaalkali metal triphosphate, anhydrous and/or converted to anhydrate form and/or hexahydrate), and crystalline phyllosilicates.

The builders for laundry detergents are preferably crystalline aluminosilicates (zeolites, monomeric, oligomeric or polymeric or copolymeric carboxylic acids, alkali metal orthophosphates, pyrophosphates and polyphosphates (monomeric, dimeric, oligomeric or polymeric alkali metal phosphates, preferably pentaalkali metal triphosphate, anhydrous and/or converted to anhydrate form and/or hexahydrate), and crystalline phyllosilicates.

Of further suitability as a constituent according to the invention are organic cobuilders such as mono-, di-, tri-, oligo- and/or polycarboxylic acids, hydroxycarboxylic acids, aminocarboxylic acids and phosphonic acids, preferably in the form of their water-soluble salts. Preferred oligocarboxylic acids are citric, tartaric and maleic acid, etc.

pH Regulators

Alkali metal carbonates (soda), alkali metal sesquicarbonates (Trona), alkali metal hydrogencarbonates (bicarbonate), crystalline alkali metal silicates without a layer structure (metasilicates) and/or X-ray-amorphous alkali metal silicates.

Surface-active Substances

The surface-active substances are preferably anionic, cationic, nonionic and/or zwitterionic surfactants.

Particularly preferred nonionic surfactants are alkyl alkoxylates, gluconamides and alkylpolyglycosides.

Among the alkyl alkoxylates it is preferred to use ethoxylated alcohols, preferably primary alcohols, having preferably 8 to 22 carbon atoms and preferably 1 to 80 EO units per mole of alcohol, the alcohol radical being linear or, preferably, methyl-branched in position 2 or containing a mixture of linear and methyl-branched radicals, such as is normally the case in oxo alcohol residues. The preferred ethoxylated alcohols include, for example, $C_{11}$ alcohols having 3, 5, 7, 8 and 11 EO units, $C_{12}$–$C_{15}$ alcohols having 3, 6, 7, 8, 10 and 13 EO units, $C_{14}$–$C_{15}$ alcohols having 4, 7 or 8 EO units, $C_{16}$–$C_{18}$ alcohols having 8, 11, 15, 20, 25, 50 or 80 EO units, and mixtures thereof. The stated degrees of ethoxylation represent statistical average values, which for any given product may be a whole number or a fractional number. In addition to these it is also possible to use fatty alcohol EO/PO adducts, such as the ®Genapol grades 3970, 2909 and 2822 from Clariant GmbH.

Further suitable surfactants are polyhydroxy fatty acid amides of the formula $R_2$—CO—N($R_3$)—Z, in which $R_2$CO is an aliphatic acyl radical having 6 to 22 carbon atoms, $R_3$ is hydrogen or an alkyl or hydroxyl alkyl radical having 1 to 4 carbon atoms and Z is a linear or branched polyhydroxy alkyl radical having 3 to 10 carbon atoms and 3 to 10 hydroxyl groups.

With preference it is possible to use alkyl glycosides of the formula RO(G)$_x$ in which R is a primary straight-chain or methyl-branched aliphatic radical, particularly an aliphatic radical methyl-branched in position 2, having 8 to 22, preferably 12 to 18, carbon atoms and G is a glycose unit having 5 or 6 carbon atoms, preferably glucose. The degree of oligomerization x, which indicates the distribution of monoglycosides and oligoglycosides, is any number between 1 and 10; preferably x is from 1.2 to 1.4.

Used with preference may be alkoxylated, preferably ethoxylated, or ethoxylated and propoxylated, fatty acid alkyl esters, preferably having 1 to 4 carbon atoms in the alkyl chain, especially fatty acid methyl esters as described, for example, in Japanese patent application JP 58/217598, or preferably those as prepared by the process described in International patent application WO 90/13533.

Suitable anionic surfactants of the sulfonate type include with preference the known $(C_9-C_{13})$-alkylbenzenesulfonates, alpha-olefinsulfonates and alkanesulfonates. Also suitable are esters of sulfo fatty acids or the disalts of alpha-sulfo fatty acids. Further suitable anionic surfactants are sulfated fatty acid glycerol esters, which represent monoesters, diesters and triesters, and also mixtures thereof, as obtained in the preparation by esterification with 1 mol of monoglycerol with from 1 to 3 mol of fatty acid or in the transesterification of triglycerides with from 0.3 to 2 mol of glycerol. Particularly suitable alkyl sulfates are the sulfuric monoesters of $C_{12}-C_{18}$ fatty alcohols, such as lauryl, myristyl, cetyl or stearyl alcohol, and the fatty alcohol mixtures that are obtained from coconut oil, palm oil and palm kernel oil and may additionally contain fractions of unsaturated alcohols, e.g., oleyl alcohol.

Further suitable anionic surfactants include soaps in particular. Suitability is possessed by saturated fatty acid soaps, such as the salts of lauric acid, myristic acid, palmitic acid, stearic acid, hydrogenated erucic acid and behenic acid, and also soap mixtures derived in particular from natural fatty acids, e.g., coconut, palm kernel or tallow fatty acids. The anionic surfactants may be in the form of their sodium, potassium or ammonium salts, and also as soluble salts of organic bases, such as mono-, di- or triethanolamine. The anionic surfactants are preferably in the form of their sodium or potassium salts, in particular in the form of the sodium salts.

Suitable surfactants are chlorine-stable block copolymers of long-chain aliphatic alcohols containing ethylene oxide or propylene oxide groups or modified fatty alcohol polyglycol ethers or monoalkyl and dialkyl sulfates or alkanesulfonates or amine oxides or fatty acid methyl polyglycol esters.

Bleach

The bleach systems preferably comprise active chlorine carriers such as sodium dichloroisocyanurate or sodium hypochlorite solution (chlorine bleaching liquor) and/or organic or inorganic active oxygen carriers (such as hydrogen peroxide, alkali metal peroxides, alkaline earth metal peroxides, alkali metal perborate, persulfate, percarbonate or perphosphate, and percarboxylic acids and their salts, such as dodecane peroxide dicarboxylic acid or magnesium peroxyphthalate), bleach activators (e.g., TAED), bleaching catalysts (complexes of manganese with specific ligands, e.g., derivatives of triazacyclononane), enzymes for removing stains, perborates and/or percarbonates.

Foam in dishwashers, generally brought about by foam-producing surfactants or protein-containing food residues, results in a reduction in wash performance. Examples of preferred foam suppressants in dishwashing detergents include chloride-stable phosphoric esters, such as triisobutyl phosphate (defoamer TIP from Clariant GmbH), or known silicones such as the SP grades from Wacker Chemie GmbH. Particular preference is given to the ethoxylated-propoxylated fatty acid alkyl esters mentioned earlier (Genapol 2822®, Fa. Clariant).

Finally the detergents may if desired further comprise enzymes, for fiber care or soil removal, for example, foam suppressants, fiber protectants, color redeposition inhibitors, soil release polymers and silver corrosion inhibitors (ADD).

Examples of preferred enzymes include protease, amylase, lipase and cellulose.

Process for Producing Detergents

A preferred process for producing detergents comprises introducing a portion of the solid detergent ingredients into a mixer, applying the liquid detergent ingredients and subsequently mixing in the remaining solid detergent ingredients (dry mixing method).

Preferred mixers are plowshare mixers, free-fall mixers, zigzag (Petterson Kelly) mixers, and annular gap mixers.

It is preferred to pump in and/or spray on the liquid detergent ingredients. A preferred temperature is from 0 to 200° C.

It is preferred at the same time to introduce a gas stream heated at from 0 to 400° C. and to carry out drying. Preferred gas is air, nitrogen or steam.

Preference is given to producing premixes of individual detergent ingredients by agglomeration, compacting and/or extrusion.

General Procedure for Producing the Machine Dishwash Products

The solid components, with the exception of enzymes, bleach and perfume, were charged to a Lödige plowshare mixer and thoroughly mixed. Then the alkyl ethoxylate was sprayed on. Enzymes, perfume and bleach system were mixed in at the end.

In order to examine the effect of dishwasher detergent formulations on the appearance of ware, glasses in particular in this case, long-term tests are carried out in special wash machines which have a special mechanism that allows the automatic starting and ending of wash cycles. At the same time the detergent can be metered automatically, with older models being designed for powder while newer machines are also able to meter tabs automatically.

The results described below were generated using powder detergents on automatic, so-called glass testing machines which open the door of the machine for 30 minutes after each wash cycle so that the ware dries off completely.

The corrosion was determined largely in accordance with the test conditions of the draft standard for DIN 50275. This standard specifies the conditions under which ware of glass, ceramic, vitreous ceramic and metal, for example, is to be tested for its response to the combined chemical, thermal and mechanical exposures involved in washing in household dishwashers.

The machine load consisted of 12 place settings of standard white porcelain, stainless steel cutlery and, as test material, glasses of varying provenance, composition and form (soda-lime, lead crystal and potash crystal glasses).

Washing was carried out using the 65° C. universal program, with water consumption of 5 l/wash and a machine-monitored water hardness of <3°d [German hardness]. 20 g of detergent and 3 ml of rinse aid were metered in.

The wear at the glass surface after 500 wash cycles was evaluated and ascertained by weighing.

Scoring

A determination is made of the number of washes after which visible clouding first becomes apparent.

| Rating | Black Box |
|---|---|
| 0 | no clouding |
| 1 | very slight clouding/iridescence |
| 2 | slight clouding/iridescence |
| 3 | distinct clouding |

The arithmetic mean, formed from the sum of the evaluations and number of glasses, gives the rating for the damage that has occurred.

EXAMPLE 1

In a five liter glass beaker 2233 g of zinc sulfate heptahydrate are dissolved at 50° C. with stirring in 1767 g of polymer solution (55% by weight active substance, according to EP-A-0 849 355).

EXAMPLE 2

In a five liter glass beaker 124 g of basic zinc carbonate $(ZnCO_3)_2*(Zn(OH)_2)_3$ are dissolved at 100° C. with stirring in 3876 g of polymer solution (55% by weight active substance, according to EP-A-0 849 355).

EXAMPLE 3

In a five liter glass beaker 396 g of zinc powder are dissolved at 100° C. with stirring in 3604 g of polymer solution (55% by weight active substance, according to EP-A-0 849 355).

EXAMPLE 4

Comparative 500 g of a solution prepared as in Example 1 are dried in a drying oven at 120° C. The dried material is crushed using a mortar and sieved through a 250 μm sieve. A sample is stored in a desiccator over saturated ammonium sulfate solution for 5 days at 20° C. (80% rH). After 5 days the sample has flowed out to form a sticky liquid.

EXAMPLE 5

Comparative, Amorphous Disilicate

In a mixer from Schugi (model Flexomix 160) with downstream batch fluid bed 1875 kg of amorphous sodium disilicate (80% AS) are mixed for an hour with 946 kg of polymer solution (prepared as in Example 1) and the mixture is subsequently dried to the desired moisture content (air entry temperature 150° C.). The product is sieved off using an Allgeier sieve, through a 1200 μm sieve and on a 200 μm sieve. The product has a sodium disilicate content of about 75% by weight, a polymer content of about 18% by weight, a residual moisture content of about 7% by weight, a zinc content of about 6% and an average particle size of 474 μm.

A sample is stored in a desiccator over saturated ammonium sulfate solution for 5 days at 20° C. (80% rH). After 5 days the sample has flowed out to form a sticky liquid.

EXAMPLE 6

Inventive

In a mixer from Schugi (model Flexomix 160) with downstream batch fluid bed 1500 kg of crystalline layered sodium disilicate (100% AS; phase distribution: 70% delta-sodium disilicate, 20% alpha-sodium disilicate, 5% beta-sodium disilicate, 5% X-ray-amorphous silicate fractions) are mixed for an hour with 946 kg of polymer solution (prepared as in Example 1) and the mixture is subsequently dried to the desired moisture content (air entry temperature 150° C.). The product is sieved off using an Allgeier sieve, through a 1200 μm sieve and on a 200 μm sieve. At the same time a stream of hot air is introduced and drying is carried out until the desired moisture content is reached. The product has a sodium disilicate content of about 75% by weight, a polymer content of about 11.5% by weight, a residual moisture content of about 7% by weight, a zinc content of about 6%, an average particle size of 474 μm and a bulk density of 550 g/l.

A sample is stored in a desiccator over saturated ammonium sulfate solution for 5 days at 20° C. (80% rH). After 5 days the sample is a free-flowing powder.

EXAMPLE 7

Inventive

In a Lödige plowshare mixer 4350 g of crystalline layered sodium disilicate (100% AS; phase distribution: 70% delta-sodium disilicate, 20% alpha-sodium disilicate, 5% beta-sodium disilicate, 5% X-ray-amorphous silicate fractions) are slowly sprayed with 1205 g of polymer solution (prepared as in Example 1). At the same time a stream of hot air is introduced and drying is carried out until the desired moisture content is reached. The product has a sodium disilicate content of about 87% by weight, a polymer content of about 6% by weight, a residual moisture content of about 4% by weight, a zinc content of about 3% and an average particle size of about 260 μm.

A sample is stored over saturated ammonium sulfate solution in a desiccator at 20° C. for 5 days (80% rH). After 5 days the sample is a free-flowing powder.

EXAMPLE 8

Inventive

In a Lödige plowshare mixer 3750 g of crystalline layered sodium disilicate (100% AS; phase distribution: 70% delta-sodium disilicate, 20% alpha-sodium disilicate, 5% beta-sodium disilicate, 5% X-ray-amorphous silicate fractions) are slowly sprayed with 1631 g of polymer solution (prepared as in Example 2). At the same time a stream of hot air is introduced and drying is carried out until the desired moisture content is reached. The product has a sodium disilicate content of about 75% by weight, a polymer content of about 17.4% by weight, a residual moisture content of about 7% by weight, a zinc content of about 0.6% and an average particle size of about 260 μm.

A sample is stored over saturated ammonium sulfate solution in a desiccator at 20° C. for 5 days (80% rH). After 5 days the sample is a free-flowing powder.

EXAMPLE 9

Inventive

In a Lödige plowshare mixer 3750 g of crystalline layered sodium disilicate (100% AS; phase distribution: 70% delta-sodium disilicate, 20% alpha-sodium disilicate, 5% beta-sodium disilicate, 5% X-ray-amorphous silicate fractions) are slowly sprayed with 1515 g of polymer solution (prepared as in Example 3). At the same time a stream of hot air is introduced and drying is carried out until the desired moisture content is reached. The product has a sodium disilicate content of about 75% by weight, a polymer content of about 15% by weight, a residual moisture content of about 7% by weight, a zinc content of about 3% by weight and an average particle size of about 260 μm.

A sample is stored over saturated ammonium sulfate solution in a desiccator at 20° C. for 5 days (80% rH). After 5 days the sample is a free-flowing powder.

EXAMPLE 10

Comparative

In accordance with the general instructions on producing machine dishwash products a machine dishwash product is prepared from the ingredients listed in Table 1, using product from Example 5. The zinc content is 0.4% by weight. The machine dishwash product is evaluated in accordance with the general instructions of "determining the corrosion of glasses" after 500 washes. The results are set out in Table 1.

EXAMPLE 11

In accordance with the general instructions on producing machine dishwash products a machine dishwash product is prepared from the ingredients listed in Table 1, using product from Example 6. The zinc content is 1% by weight.

EXAMPLE 12

In accordance with the general instructions on producing machine dishwash products a machine dishwash product is prepared from the ingredients listed in Table 1, using product from Example 6. The zinc content is 0.4% by weight. The machine dishwash product is evaluated in accordance with the general instructions of "determining the corrosion of glasses" after 500 washes. The results are set out in Table 1.

EXAMPLE 13

In accordance with the general instructions on producing machine dishwash products a machine dishwash product is prepared from the ingredients listed in Table 1, using product from Example 7. The zinc content is 0.2% by weight.

EXAMPLE 14

In accordance with the general instructions on producing machine dishwash products a machine dishwash product is prepared from the ingredients listed in Table 1, using product from Example 8. The zinc content is 0.04% by weight.

EXAMPLE 15

In accordance with the general instructions on producing machine dishwash products a machine dishwash product is prepared from the ingredients listed in Table 1, using product from Example 8. The zinc content is 0.01% by weight.

EXAMPLE 16

In accordance with the general instructions on producing machine dishwash products a machine dishwash product is prepared from the ingredients listed in Table 1, using product from Example 9. The zinc content is 0.2% by weight.

EXAMPLE 17

In accordance with the general instructions on producing machine dishwash products a machine dishwash product is prepared from the ingredients listed in Table 1, using commercially available SKS-6 HD (from Clariant, sodium disilicate content about 75% by weight, polymer content about 18% by weight, residual moisture content about 7% by weight). The zinc content is 0% by weight. The machine dishwash product is evaluated in accordance with the general instructions of "determining the corrosion of glasses" after 500 washes. The results are set out in Table 1.

TABLE 1

Composition of the machine dishwashing detergents

| Example | 10 | 11 | 12 | 13 | 14 | 15 | 16 | 17 |
|---|---|---|---|---|---|---|---|---|
| Product from Ex. 5 (comparative) | 6.7 | | | | | | | |
| Product from Ex. 6 (inventive) | | 16.7 | 6.7 | | | | | |
| Product from Ex. 7 (inventive) | | | | 6.7 | | | | |
| Product from Ex. 8 (inventive) | | | | | 6.7 | 1.7 | | |
| Product from Ex. 9 (inventive) | | | | | | | 6.7 | |
| SKS-6 HD | | | | | | | | 6.7 |
| Soda | 28 | 20.3 | 28 | 28 | 28 | 28 | 28 | 28 |
| Sodium sulfate | 2.3 | — | 2.3 | 2.3 | 2.3 | 7.3 | 2.3 | 2.3 |
| Sodium tripolyphosphate | 48 | 48 | 48 | 48 | 48 | 48 | 48 | 48 |
| Sodium perborate monohydrate | 10 | 10 | 10 | 10 | 10 | 10 | 10 | 10 |
| Peractive CB | 2 | 2 | 2 | 2 | 2 | 2 | 2 | 2 |
| Enzymes | 1.5 | 1.5 | 1.5 | 1.5 | 1.5 | 1.5 | 1.5 | 1.5 |
| Genapol 2822 | 1.5 | 1.5 | 1.5 | 1.5 | 1.5 | 1.5 | 1.5 | 1.5 |
| Zinc content | 0.402 | 1 | 0.402 | 0.2 | 0.04 | 0.01 | 0.2 | 0 |
| Weight change after 500 washes [parts per thousand] | | | | | | | | |
| Lead crystal | 1.1 | | −1.3 | | | | | −3.1 |
| Potash crystal | 1.3 | | −4 | | | | | −6.7 |
| Black box scoring | | | | | | | | |
| Lead crystal | 3 | 0 | 0 | 0 | 0 | 0 | 0 | 0 |
| Potash crystal | 3 | 0 | 0 | 0 | 0.5 | 0.5 | 0.5 | 0.5 |

What is claimed is:

1. An adsorbate consisting of a soluble zinc compound of a polycarboxylic acid and a crystalline alkali metal phyllosilcate, wherein the soluble zinc compound of a polycarboxylic acid is adsorbed on the crystalline alkali metal phyllosilicate.

2. The adsorbate as claimed in claim 1, wherein said adsorbate consists of from 50 to 99% by weight of the crystalline alkali metal phyllosilicate, from 0.1 to 40% by weight of polycarboxylic acid and from 0.1 to 20% by weight of zinc, calculated as the element.

3. The adsorbate as claimed in claim 1, wherein said adsorbate consists of from 60 to 95% by weight of crystalline alkali metal phyllosilicate, from 10 to 30% by weight of polycarboxylic acid and from 0.1 to 10% by weight of zinc, calculated as the element.

4. The adsorbate as claimed in claim 1, wherein the polycarboxylic acid consists of from 10 to 70% by weight of maleic acid, from 20 to 85% by weight of acrylic acid, from 0 to 10% by weight of vinyl acetate and from 0 to 10% by weight of further monomers, with a degree of neutralization of from 0 to 70%.

5. The adsorbate as claimed in claim 1, wherein the polycarboxylic acid consists of homopolymers and/or copolymers selected from the group consisting of acrylic acid, methacrylic acid, maleic acid, polyaspartic acid, sugar carboxylic acid and mixtures thereof, wherein the homopolymers and/or copolymers are non-neutralized or only partly neutralized.

6. The adsorbate as claimed in claim 1, wherein the polycarboxylic acid has an average molar mass of from 1000 to 100 000 g/mol.

7. The adsorbate as claimed in claim 1, wherein the polycarboxylic acid has a degree of neutralization of the acid groups of from 1 to 100%.

8. The adsorbate as claimed in claim 1, having a pH of from 8 to 10 at 2° C. after 10 mm in 0.1% aqueous dispersion.

9. The adsorbate as claimed in claim 1, having a bulk density of between 400 and 800 g/l.

10. The adsorbate as claimed in claim 1, having a Hunter whiteness of from 80 to 100.

11. The adsorbate as claimed in claim 1, having a Hunter a value of from −1.5 to +1.5.

12. The adsorbate as claimed in claim 1, having a Hunter b value of from 0 to +2.

13. The adsotate as claimed in claim 1, having a release rate of from 0.0001 to 12 g zinc*$l^{-1}$*$h^{-1}$.

14. A process for preparing an adsorbate as claimed in claim 1, comprising the steps agglomerating a solution of the soluble zinc compound of a polycarboxylic acid with crystalline alkali metal phyllosilicate in a granule-building mixer to form an agglomerate and dying the agglomerate.

15. The process as claimed in claim 14, wherein agglomeration step is carried out at from 0 to 200° C. under a pressure of from 0.1 to 100bar for a time of from 0.01 h to 1 h.

16. A process for preparing an adsorbate as claimed in claim 1, comprising the steps of adsorbing the soluble zinc compound of a polycarboxylic acid onto the crystalline alkali metal phyllbsilicate by roll compacting to form a compacted composition, grinding the compacted composition and classifying the compacted composition.

17. A process for preparing an adsorbate as claimed claim 1, comprising the step of adsorbing the soluble zinc compound of a polycarboxylic acid onto the crystalline alkali metal phyllosilicate by fluid-bed size-enlargement granulation.

18. A process for releasing a soluble zinc compound into a detergent solution comprising the steps of agglomerating a soluble zinc compound of a polycarboxylic acid with an alkali metal phyllosilicate to form the adsorbate of claim 1, mixing the adsorbate with a detergent to form a mixture and dissolving the mixture in mains water or deionized water.

19. A detergent comprising an adsorbate as claimed in claim 1.

20. A detergent comprising:
    from 10 to 90% by weight of at least one builder and at least one cobuilder;
    from 10 to 90% by weight of at least one pH regulator;
    from 0.1 to 20% by weight of bleach;
    from 0 to 10% by weight of at least one surface-active substance; and
    from 0.01 to 10% by weight of the adsorbate as claimed in claim 1.

21. The detergent as claimed in claim 20, comprising:
    from 20 to 50% by weight of at least one builder and at least one cobuilder;
    from 10 to 50% by weight of at least one pH regulator;
    from 1 to 20% by weight of bleach;
    from 0 to 10% by weight of at least one surface-active substance; and
    from 0.1 to 10% by weight of the adsorbate as claimed in claim 1.

22. A detergent comprising:
    from 10 to 90% by weight of at least one builder and at least one cobuilder;
    from 1 to 9% by weight of at least one pH regulator;
    from 0.1 to 50% by weight of at least one surface-active substance;
    from 1 to 10% by weight of bleach; and
    from 0.1 to 10% by weight of the adsorbate as claimed in claim 1.

23. A detergent comprising:
    from 10 to 90% by weight of at least one builder and at least one cobuilder;
    from 1 to 9% by weight of at least one pH regulator;
    from 0.1 to 50% by weight of at least one surface-active substance; and
    from 0.1 to 10% by weight of the adsorbate as claimed in claim 1.

24. The adsorbate as claimed in claim 1, wherein the polycarboxylic acid has an average molar mass of from 2000 to 70 000 g/mol.

25. The adsorbate as claimed in claim 1, wherein the polycarboxylic acid has an average molar mass of from 2000 to 35 000 g/mol.

26. The adsorbate as claimed in claim 1, wherein the polycarboxylic acid has a degree of neutralization of the acid groups of from 10 to 90%.

27. The adsorbate as claimed in claim 1, wherein the polycarboxylic acid has a degree of neutralization of the acid groups of from 30 to 70%.

28. The adsorbate as claimed in claim 1, having a pH of from 10 to 12 at 2° C. after 10 min in 0.1% aqueous dispersion.

29. The adsorbate as claimed in claim 1, having a bulk density of between 400 and 700 g/l.

30. The adsorbate as claimed in claim 1, having a Hunter whiteness of from 85 to 95.

31. The adsorbate as claimed in claim 1, having a Hunter a value of from from −0.8 to 0.

32. The adsorbate as claimed in claim 1, having a Hunter b value of from 0.2 to 1.5.

33. The adsorbate as claimed in claim 1, having a release rate of from 0.0002 to 2.4 g zinc$*l^{-1}*h^{-1}$.

34. The detergent as claimed in claim 19, wherein the detergent is a laundry detergent.

35. The detergent as claimed in claim 20, wherein the detergent is a laundry detergent.

36. The detergent as claimed in claim 22, wherein the detergent is a laundry detergent.

37. The detergent as claimed in claim 23, wherein the detergent is a laundry detergent.

38. The adsorbate as claimed in claim 2, wherein the adsorbate consists of from 0.6 to 6% by weight of zinc, calculated as the element.

* * * * *